V. FRANK.
ACTUATING MECHANISM.
APPLICATION FILED APR. 26, 1910.

1,084,621.

Patented Jan. 20, 1914.

2 SHEETS—SHEET 1.

Witnesses:
Harry S. Gaither
Henry A. Parks

Inventor:
Vincent Frank

V. FRANK.
ACTUATING MECHANISM.
APPLICATION FILED APR. 26, 1910.
1,084,621.
Patented Jan. 20, 1914.
2 SHEETS—SHEET 2.
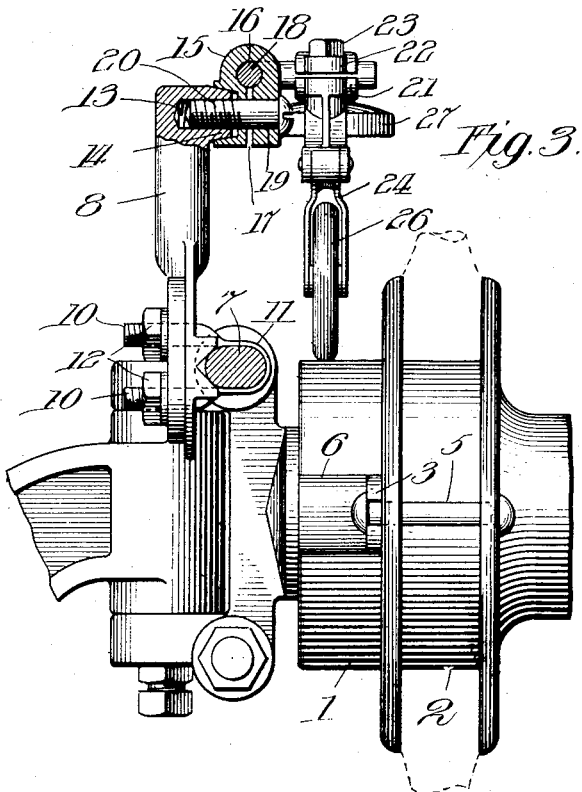
Witnesses:
Harry S. Gaither
Henry A. Parks
Inventor:
Vincent Frank
by
Att'ys

UNITED STATES PATENT OFFICE.

VINCENT FRANK, OF CHICAGO, ILLINOIS, ASSIGNOR TO SHAFTLESS SPEEDOMETER COMPANY, OF CHICAGO, ILLINOIS, A CORPORATION OF SOUTH DAKOTA.

ACTUATING MECHANISM.

1,084,621.   Specification of Letters Patent.   Patented Jan. 20, 1914.

Application filed April 26, 1910. Serial No. 557,636.

*To all whom it may concern:*

Be it known that I, VINCENT FRANK, a citizen of the United States, residing at Chicago, in the county of Cook and State of Illinois, have invented certain new and useful Improvements in Actuating Mechanism, of which the following is a specification.

The object of my invention is to provide an improved actuating mechanism for a speedometer or odometer, such as ordinarily used upon automobiles and other vehicles. The device, however, may be used in other connections, being equally available for use in connection with measuring instruments of any kind or other appliances actuated by a rotating member.

The particular nature of my invention and its objects will more fully appear from the following description and claim, taken in connection with the accompanying drawings, in which—

Figure 1:
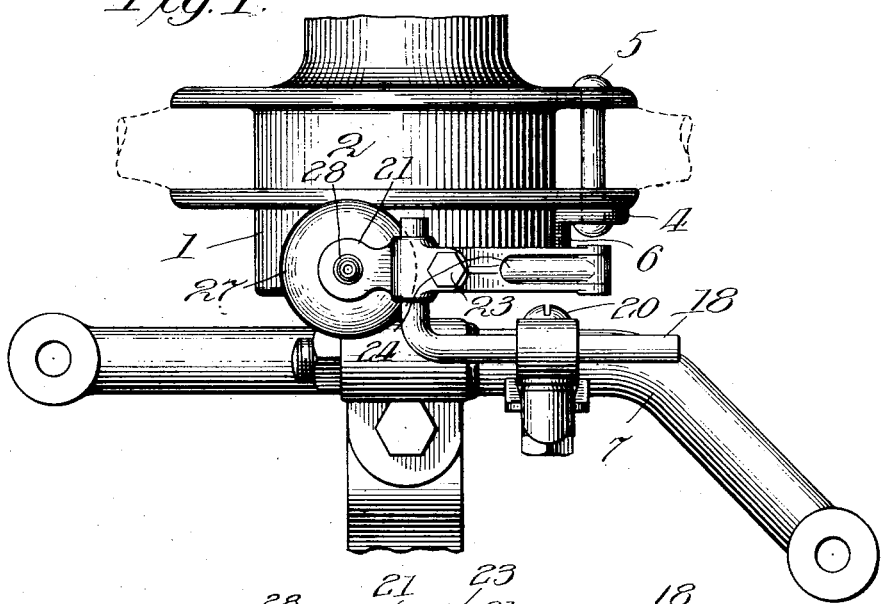
Figure 2:
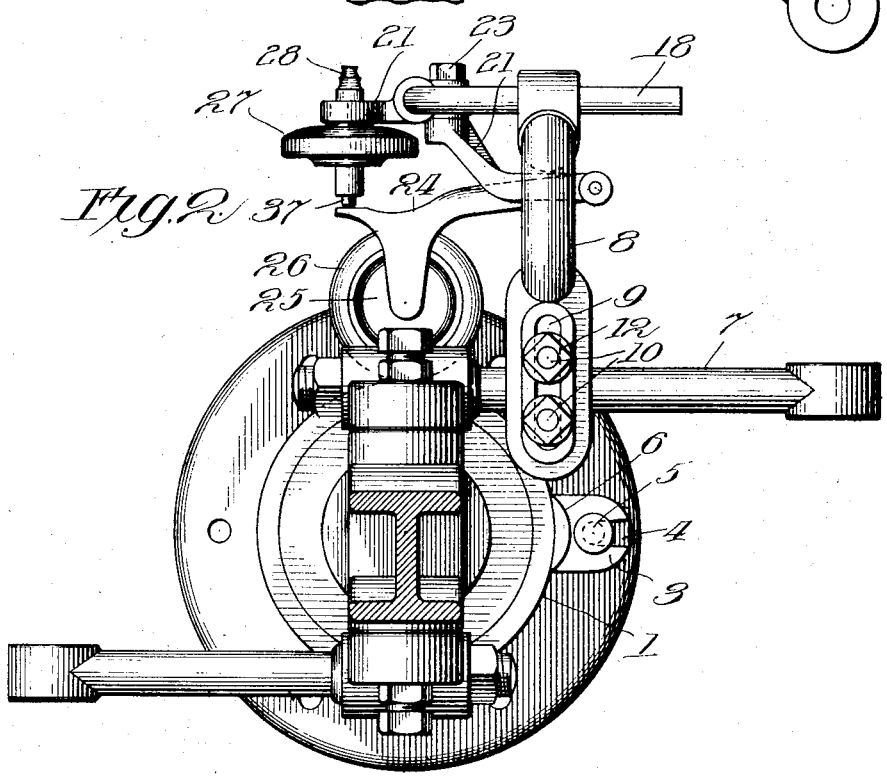

Figure 1 is a plan view of my device, together with the adjacent parts of an automobile axle and steering knuckle. Fig. 2 is a side elevation of the structure shown in Fig. 1. Fig. 3 is an end elevation of the structure shown in Fig. 1. Fig. 4 is a sectional view of a pneumatic pulsator, forming part of my device. Fig. 5 is a plan view from beneath, with the lower part of the casing removed. Fig. 6 is a view similar to Fig. 4, showing a modification. Fig. 7 is a plan view from beneath of the modification shown in Fig. 6, the lower casing member being removed.

I have illustrated my device applied to an automobile. As ordinarily constructed a circular boss 1 extends inwardly from the hub 2 of an automobile front wheel. Upon the surface of the boss 1 I mount a cam member having an outwardly projecting arm 3 slotted at 4 to pass over the stem and beneath the head of one of the bolts 5 which hold the hub plates of the wheel together. The cam member also comprises an inwardly extending arm 6, the inner face of which lies against the boss 1. The outer face of the arm 6 is curved outwardly to form a cam projection upon the surface of the boss 1.

My improved mechanism is actuated by the engagement of the cam surface 6 during the rotation of the wheel with the coöperating parts of the device. Mounted upon the knuckle 7 is an upright member 8, the lower end of which is slotted at 9 to receive the ends of the U-shaped clip 10, the central part of which is flattened at 11 and passed around the knuckle 7. Nuts 12 engaging the screw threaded ends 10 of the U-shaped clip serve to draw the same tightly around the knuckle and hold the upright member 8 securely in position. At its upper end the member 8 is provided with a screw threaded aperture 13, the outer end of which is surrounded by a conical boss 14. A sleeve member 15 is provided with a cylindrical aperture 16, and the sleeve is split, as indicated at 17, in order that the sleeve may be drawn into binding engagement with an L-shaped arm 18. A screw hole 19 passes through the sleeve member 15 registering with the conical recess in the sleeve member which overlies the conical boss 14. It will be apparent that by turning the screw 20 into the aperture 13, the member 15 will be held securely in place upon the arm 8 and that the arm 18 will be secured in its adjusted position in the sleeve member. The arm 18 is constructed with a right-angular bend, and a frame member 21 is sleeved over the outer end of the arm 18, the frame member being provided for this purpose with a circular aperture cut away at 22 to form a split ring. A machine screw 23 serves to hold the split ring tightly upon the member 18. Pivoted to the lower end of the frame member 21 is an actuating arm 24 which carries a rotatable roller 25, the roller preferably being provided with a rubber or other elastic tire 26. The disposition of the parts is such that the tire 26 of the roller 25 bears upon the periphery of the boss 1 in such manner as to be engaged by its cam surface 2 upon each revolution of the wheel.

A pneumatic pulsator 27 is secured to the upper end of the frame 21, preferably by screw threading the stem 28 thereof, through said frame member in such manner that the stem 28, which is formed for connection with a rubber tube, will project above the same. The preferred form of pulsator, as illustrated in Fig. 4, comprises a casing having an upper member 27' and a lower member 28', the two members being threaded together, as indicated at 29. The upwardly projecting stem 28 is preferably screw threaded, as indicated at 30, for connection with the frame 21 as above described, and an aperture 31 extending through said stem affords communication between the interior of the casing and the mechanism to which the device is connected by means of a rubber hose or other pipe. A diaphragm 32, formed of leather or other yielding material, is clamped at its edges between the members 27' and 28' of the casing, and is normally held in depressed position by means of a spring 33 preferably taking the form of a spider having a central part 34 from which radiate arms 35. The spring 33 is formed so that the radial arms 35 normally lie at an angle to the plane of the central part 34, and when the device is assembled as illustrated in Fig. 4, the radial arms bear against the inner surface of the upper casing member 27' and the central part of the spring bears against the center of the diaphragm 32, tending to hold the center of the diaphragm depressed. At its outer surface the lower casing member 28' is provided with a projecting boss 36, and a plunger 37 extends through an aperture in this boss to the interior of the casing. Upon its inner end the plunger 37 is preferably provided with an enlarged head 38 adapted to engage the under surface of the diaphragm 32. The length of the plunger 37 is such that when the diaphragm 32 is depressed by the tension of the spring 33, the lower end of the plunger 37 extends beyond the boss 36. The parts are shown in their normal position in Fig. 4.

The pivoted arm 24 at its free end lies just beneath the plunger 37, as shown in Fig. 2, the parts being so arranged and proportioned that when the tire 26 of the roller 25 rests upon the cylindrical part of the boss 1 the arm 24 will just clear the plunger 37 and permit the spring 33 to depress the diaphragm 32. On each rotation of the wheel however, the cam projection 6 raises the arm 24, and this in turn raises the plunger 37 and elevates the diaphragm 32, thus compressing the air above the diaphragm. As soon as the cam 6 passes beyond the roller 25, the spring 33 depresses the diaphragm, thus permitting the air confined above it to assume its normal tension, and in the event of the escape of any of the air, to slightly rarefy the air above the diaphragm for a moment. It will be understood that the nipple 28 of the pulsator is connected by a rubber tube or other pipe with some form of mechanism, such as that illustrated in my pending application Serial No. 455,249, filed September 29, 1908, such mechanism being actuated by a series of pulsations, or intermittent increases in pressure in the air confined above the diaphragm.

In Fig. 6 I have illustrated a modification of the pulsator in which the diaphragm 32' is held normally in a depressed position by means of a helical spring 40, which at one end engages a shoulder 41 in the bore of the nipple 28'' and at the other end engages a plate 42, which bears against the central part of the diaphragm. The operation of this device will be the same as that above described.

In practice I have found that the apparatus herein shown and described is practically noiseless in operation and that it produces a series of distinct pulsations which insure a positive and accurate operation of the connected mechanism.

While I have described and shown a specific embodiment of my invention, it will be readily understood that the principle thereof may be applied without adhering to the precise form of mechanism upon which this description of my invention is based.

I claim:

A pulsator comprising a casing, an elastic diaphragm dividing said casing into two chambers, a spider spring comprising a central part and radial arms, the central part engaging said diaphragm and the arms engaging the casing, and a plunger at one end engaging said diaphragm and at the other end extending to the exterior of said casing.

In testimony whereof, I have subscribed my name.

VINCENT FRANK.

Witnesses:
 WALTER A. SCOTT,
 HENRY A. PARKS.